United States Patent
Kimura et al.

(10) Patent No.: US 12,079,763 B2
(45) Date of Patent: Sep. 3, 2024

(54) PRODUCT DELIVERY SYSTEM, PRODUCT DELIVERY DEVICE, AND COMPUTER READABLE RECORDING MEDIUM

(71) Applicant: TOYOTA JIDOSHA KABUSHIKI KAISHA, Aichi-ken (JP)

(72) Inventors: Kayo Kimura, Musashino (JP); Yoshihiro Shimada, Tokyo-to (JP); Hiroyuki Kobayashi, Mitaka (JP); Takashi Nishimura, Chofu (JP); Zixun Mei, Tokyo-to (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 61 days.

(21) Appl. No.: 17/830,341

(22) Filed: Jun. 2, 2022

(65) Prior Publication Data

US 2022/0391838 A1 Dec. 8, 2022

(30) Foreign Application Priority Data

Jun. 4, 2021 (JP) .................. 2021-093993

(51) Int. Cl.
*G06Q 10/0835* (2023.01)
*G06Q 10/087* (2023.01)

(52) U.S. Cl.
CPC ....... *G06Q 10/0835* (2013.01); *G06Q 10/087* (2013.01)

(58) Field of Classification Search
CPC .................. G06Q 10/0835; G06Q 10/087
(Continued)

(56) References Cited

U.S. PATENT DOCUMENTS 10,245,993 B1 * 4/2019 Brady .................. B60P 7/13
11,144,057 B1 * 10/2021 Ebrahimi Afrouzi ........................
G05D 1/0217
(Continued)

FOREIGN PATENT DOCUMENTS

| JP | 2020152522 A | 9/2020 |
| JP | 2020152533 A | 9/2020 |
| WO | WO-2021183044 A1 * | 9/2021 |

OTHER PUBLICATIONS

Cepolina E., Venkata A.M., and Zoppi M., The use of autonomous coupling capable trailer to reduce the cost per delivery and increase profit for logistic companies: a simulative analysis. DOI: https://doi.org/10.46354/i3m.2022.hms.007 (Year: 2021).*

*Primary Examiner* — Shannon S Campbell
*Assistant Examiner* — Lisa Ma
(74) *Attorney, Agent, or Firm* — HAUPTMAN HAM, LLP (57) ABSTRACT

A product delivery system includes: a center server; a store server; a driver configured to be coupled with and decoupled from a carriage; and a terminal. A processor of the center server is configured to: acquire a scheduled loading time representing a completion time of loading of a product onto the carriage at the store, when order information on the product is output from the terminal to the store server; output, to the driver, an instruction for causing the driver to depart from a current position to the store in time for the scheduled loading time; and output, to the driver, an instruction for causing the driver coupled with the carriage to depart from the store to a delivery destination of the product, when acquiring, from the store server, a loading completion notification indicating that loading of the product onto the carriage has been completed at the store.

12 Claims, 3 Drawing Sheets

(58) Field of Classification Search
USPC .......................................................... 705/337
See application file for complete search history.

(56) References Cited

U.S. PATENT DOCUMENTS

| | | | | |
|---|---|---|---|---|
| 2011/0320376 | A1* | 12/2011 | Dearlove | ............... G06Q 10/08 |
| | | | | 705/337 |
| 2018/0060809 | A1* | 3/2018 | Seaman | ................ H04W 4/023 |
| 2018/0170675 | A1* | 6/2018 | High | ..................... B60P 1/6481 |
| 2018/0189725 | A1* | 7/2018 | Mattingly | .......... G06K 19/0723 |
| 2018/0336751 | A1* | 11/2018 | Wilkinson | ............. G05D 1/028 |
| 2019/0304219 | A1* | 10/2019 | Phillips | .............. G07C 9/00912 |
| 2019/0318298 | A1* | 10/2019 | Driegert | ............... G06Q 10/083 |
| 2020/0183414 | A1* | 6/2020 | Shih | ........................ B60R 25/01 |
| 2020/0300653 | A1 | 9/2020 | Miwa et al. | |
| 2020/0387863 | A1* | 12/2020 | Ruth | ................. G06Q 10/0837 |
| 2022/0012685 | A1* | 1/2022 | Cotte | .................... H04W 4/029 |
| 2022/0107650 | A1* | 4/2022 | Blume | .................. G05D 1/0221 |
| 2023/0123587 | A1* | 4/2023 | Jatt | ..................... B67D 7/0401 |
| | | | | 701/23 |

* cited by examiner

FIG.1

PRODUCT DELIVERY SYSTEM, PRODUCT DELIVERY DEVICE, AND COMPUTER READABLE RECORDING MEDIUM

The present application claims priority to and incorporates by reference the entire contents of Japanese Patent Application No. 2021-093993 filed in Japan on Jun. 4, 2021.

BACKGROUND

The present disclosure relates to a product delivery system, a product delivery device, and a computer-readable recording medium.

JP 2020-152533 A discloses a delivery system that delivers a product to a user by using a moving body capable of autonomous traveling.

SUMMARY

There is a need for a technique capable of reducing time and effort for delivering products such as food and daily necessities (e.g., time and effort for arranging delivery company each time) at a store that sends the products in accordance with an order of a user.

According to one aspect of the present disclosure, there is provided a product delivery system including: a center server including a processor; a store server provided in a store selling a product; a driver configured to be coupled with and decoupled from a carriage on which the product is loaded at the store; and a terminal held by a user purchasing the product, wherein the processor of the center server is configured to: acquire, from the store server, a scheduled loading time representing a completion time of loading of the product onto the carriage at the store, when order information on the product is output from the terminal to the store server; output, to the driver, an instruction for causing the driver to depart from a current position to the store in time for the scheduled loading time; and output, to the driver, an instruction for causing the driver coupled with the carriage to depart from the store to a delivery destination of the product, when acquiring, from the store server, a loading completion notification indicating that loading of the product onto the carriage has been completed at the store.

DETAILED DESCRIPTION

A product delivery system, a product delivery device, and a computer-readable recording medium storing a product delivery program according to an embodiment of the present disclosure will be described with reference to the drawings. Note that components in the embodiment below include those that may be easily replaced by those skilled in the art or those that are substantially the same.

Product Delivery System

The configuration of a product delivery system including a product delivery device according to the embodiment will be described with reference to FIGS. 1 and 2. A product delivery system 1 delivers a product ordered by a user from a store to a delivery destination (e.g., user home) of the product by using a moving body capable of autonomous traveling.

Figure 1:
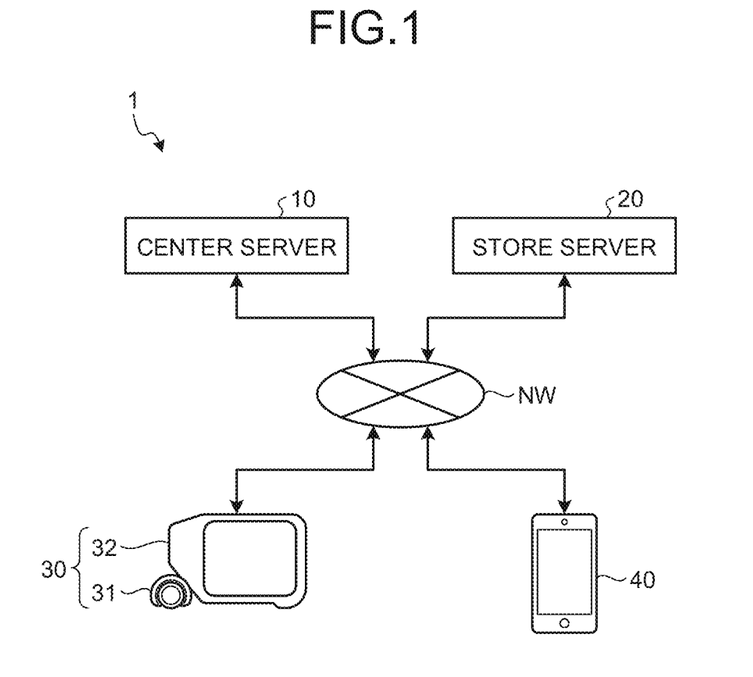
FIG. 1 is a schematic diagram illustrating the overall configuration of a product delivery system according to an embodiment.

As illustrated in FIG. 1, the product delivery system 1 includes a center server 10, a store server 20, a moving body 30, and a terminal 40. The moving body 30 includes a drive unit (driver) 31 and a carriage 32. The product delivery device according to the embodiment is implemented by the function of the center server 10 of the product delivery system 1. Furthermore, any of the center server 10, the store server 20, the moving body 30, and the terminal 40 has a communication function, and may communicate with each other over a network NW. The network NW includes, for example, an internet network and a mobile phone network. Each component of the product delivery system 1 will be described below.

Center Server

The center server 10 remotely controls the drive unit 31 to deliver a product from a store to a delivery destination. The center server 10 is provided in, for example, a management company (e.g., dealer) that manages the drive unit 31 and the carriage 32. Furthermore, the center server 10 is implemented by a general-purpose computer such as a workstation and a personal computer.

Figure 2:
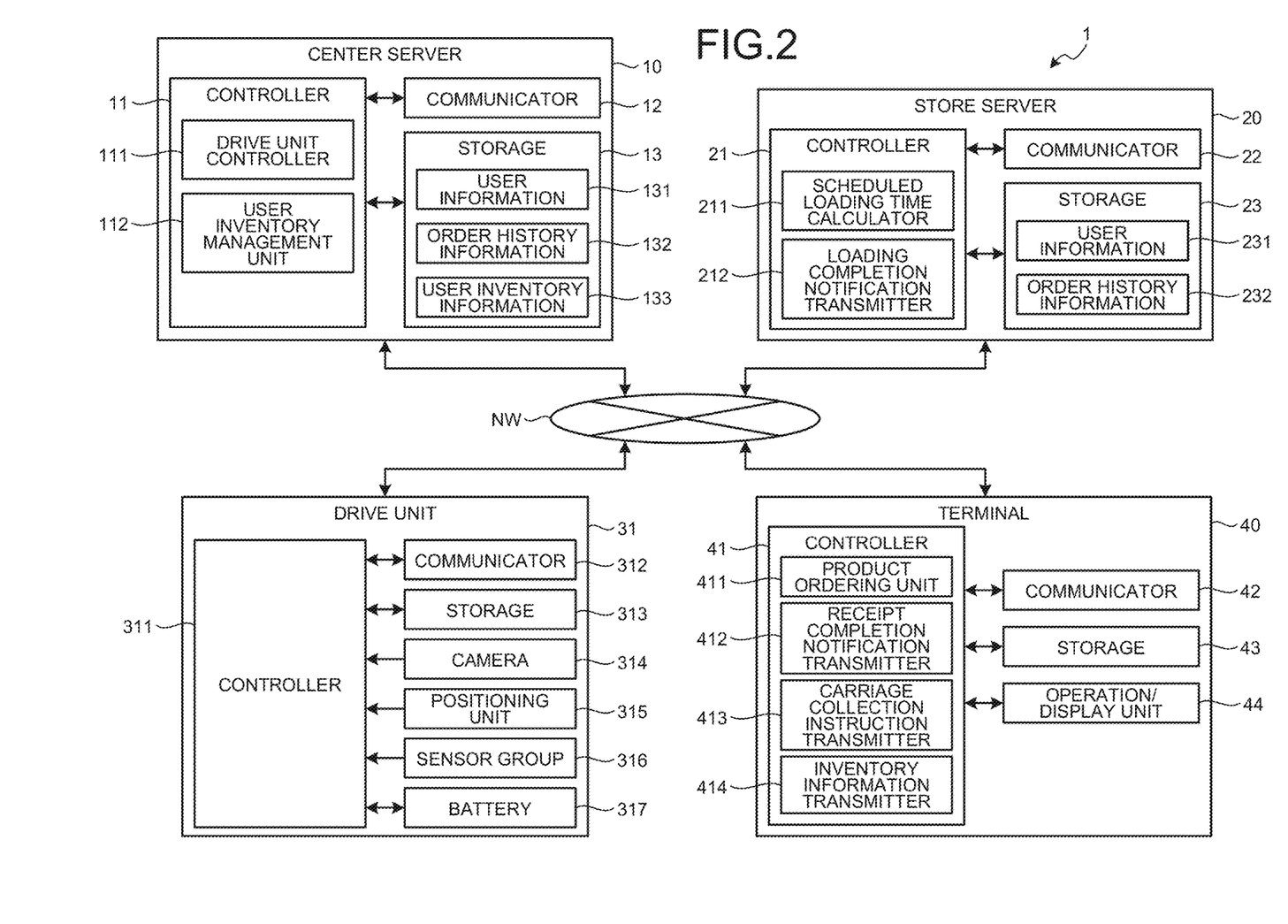
FIG. 2 is a block diagram illustrating details of each component of the product delivery system according to the embodiment.

As illustrated in FIG. 2, the center server 10 includes a controller 11, a communicator (communication device) 12, and a storage 13. Specifically, the controller 11 includes a processor and a memory (main storage). The processor includes a central processing unit (CPU), a digital signal processor (DSP), a field-programmable gate array (FPGA), a graphics processing unit (GPU), and the like. The memory includes a random access memory (RAM), a read only memory (ROM), and the like.

The controller 11 loads a program stored in the storage 13 into a work area of the main storage, and executes the program. The controller 11 implements a function that matches a predetermined purpose by controlling each component and the like through the execution of the program. The controller 11 functions as a drive unit controller 111 and a user inventory management unit 112 through the execution of the program stored in the storage 13.

The drive unit controller 111 sends the drive unit 31 to a store, and causes the drive unit 31 to autonomously moves to a delivery destination to deliver a product to a user in response to an order of the user. The drive unit 31 is coupled with the carriage 32 loaded with the product ordered by the user.

Specifically, when product order information (hereinafter, simply referred to as "order information") is output from the terminal 40 held by the user to the store server 20, the drive unit controller 111 acquires a scheduled loading time from the store server 20.

Here, the "order information" is created by a product ordering unit 411 of the terminal 40, and includes information such as an orderer (username or user ID), order date and time, an order number, a product name (or product number, product ID, or the like), an order quantity, an order amount, a delivery destination (e.g., address of user home), and designated date and time for delivery. Furthermore, the "scheduled loading time" is information on a time when loading of a product onto the carriage 32 is completed at the store, and is created by a scheduled loading time calculator 211 of the store server 20.

When acquiring the scheduled loading time from the store server 20, the drive unit controller 111 outputs, to the drive unit 31, a departure instruction for causing the drive unit 31 to depart from the current position to the store in time for the scheduled loading time. In this case, the drive unit controller 111 first determines the drive unit 31 to be sent to the store. A method for determining the drive unit 31 is not particularly limited. For example, the drive unit 31 closest to the store or the drive unit 31 having a sufficient remaining amount of a battery 317 (hereinafter, referred to as "battery remaining amount") (e.g., having battery remaining amount of predetermined threshold or more) may be determined as the drive unit 31 to be sent to the store.

Subsequently, the drive unit controller 111 calculates a departure time of the determined drive unit 31. The "departure time" indicates a time for the drive unit 31 to depart from the current position to the store. Examples of the drive unit 31 to be sent to the store include the drive unit 31 waiting at a preset waiting place (e.g., dealer and store), the drive unit 31 that has completed delivery at another store and is moving to a waiting place, and the like. Furthermore, the center server 10 constantly or periodically acquires information on a current position of the drive unit 31 (hereinafter, referred to as "position information") from the drive unit 31. Thus, the center server 10 grasps the current position of the drive unit 31.

The drive unit controller 111 calculates a moving time from the current position of the drive unit 31 to the store based on the distance from the current position of the drive unit 31 to the store and the moving speed (e.g., average moving speed) of the drive unit 31. Then, the departure time of the drive unit 31 is calculated by subtracting the moving time from the scheduled loading time acquired from the store server 20. Then, the drive unit controller 111 transmits (outputs) the departure instruction for causing the drive unit 31 to depart from the current position to the store to the drive unit 31. The "departure instruction" includes, for example, the departure time of the drive unit 31, information on the store to which the drive unit 31 is headed (e.g., address of store), and information such as a travel route to the store. Thus, the drive unit controller 111 causes the drive unit 31 to depart for the store at the departure time.

When the loading of the product onto the carriage 32 is completed at the store, the drive unit controller 111 acquires a loading completion notification from the store server 20. The "loading completion notification" is information indicating that the loading of the product onto the carriage 32 has been completed at the store, and is created by a loading completion notification transmitter 212 of the store server 20.

When acquiring the loading completion notification from the store server 20, the drive unit controller 111 transmits, to the drive unit 31, a departure instruction for causing the drive unit 31 coupled with the carriage 32 to depart from the store to a delivery destination. The "departure instruction" includes information on the delivery destination to which the drive unit 31 is headed (e.g., address of delivery destination) and information such as the travel route to the delivery destination. Thus, the drive unit controller 111 causes the drive unit 31 coupled with the carriage 32 to depart from the store to the delivery destination. Note that, for example, a staff member of the store may manually couple the drive unit 31 and the carriage 32 with each other, or a dedicated robot or the like may couple the drive unit 31 and the carriage 32 with each other.

When the receipt of the product is completed at the delivery destination, the drive unit controller 111 acquires a receipt completion notification from the terminal 40. The "receipt completion notification" is information indicating that the receipt of the product is completed at the delivery destination, and is created by a receipt completion notification transmitter 412 of the terminal 40.

When acquiring the receipt completion notification from the terminal 40, the drive unit controller 111 transmits, to the drive unit 31, a departure instruction for causing the drive unit 31 coupled with the vacant carriage 32 to depart from the delivery destination to a preset waiting place. The "departure instruction" includes information on the waiting place to which the drive unit 31 is headed (e.g., address of waiting place) and information such as a travel route to the waiting place. Thus, the drive unit controller 111 causes the drive unit 31 coupled with the vacant carriage 32 to depart from the delivery destination to the waiting place.

As described above, in the product delivery system, the product delivery device, and the product delivery program according to the embodiment, when an order from a user is received, the drive unit 31 is sent in accordance with a scheduled loading time of a product onto the carriage 32, and tows the carriage 32, whereby the product is automatically delivered to the delivery destination (e.g., user home). Therefore, the time and effort for delivering a product may be reduced at a store. Furthermore, after the delivery of a product to a delivery destination is completed, the drive unit 31 coupled with the vacant carriage 32 is moved to a waiting place to prepare for the delivery of the next product.

Here, the drive unit controller 111 may notify the user of a scheduled arrival time when the drive unit 31 coupled with the carriage 32 is to arrive at the delivery destination. In this case, when acquiring the loading completion notification from the store server 20, the drive unit controller 111 calculates the scheduled arrival time based on the time when the drive unit 31 departs from the store, the distance from the store to the delivery destination, and the moving speed (e.g., average moving speed) of the drive unit 31. Then, the drive unit controller 111 transmits the calculated scheduled arrival time to the terminal 40 held by the user.

As described above, in the product delivery system, the product delivery device, and the product delivery program according to the embodiment, a user may preliminarily know a product receipt time by sending a scheduled time of arrival at a delivery destination to the terminal 40 at the time when the loading of the product onto the carriage 32 is completed at a store, so that the product may be smoothly received.

Furthermore, when the product is delivered to the delivery destination, the drive unit controller 111 may receive collection of waste or a returned product by using the vacant carriage 32. In this case, when acquiring the receipt completion notification from the terminal 40, the drive unit controller 111 outputs, to the drive unit 31, a departure instruction for causing the drive unit 31 decoupled from the carriage 32 to depart from the delivery destination to a preset waiting place. The "departure instruction" includes information on the waiting place to which the drive unit 31 is headed (e.g., address of waiting place) and information such as a travel route to the waiting place. Note that, for example, a user may manually decouple the drive unit 31 and the carriage 32 from each other, or a dedicated robot or the like may decouple the drive unit 31 and the carriage 32 from each other.

When the loading of waste or a returned product onto the carriage 32 is completed at the delivery destination, the drive unit controller 111 acquires a carriage collection instruction from the terminal 40. The "carriage collection instruction" is information indicating that collection of the carriage 32 is requested, and is created by a carriage collection instruction transmitter 413 of the terminal 40.

When acquiring the carriage collection instruction from the terminal 40, the drive unit controller 111 transmits a departure instruction for causing the drive unit 31 to depart from the current position to the delivery destination to the drive unit 31. The "departure instruction" includes information on the delivery destination to which the drive unit 31 is headed (e.g., address of delivery destination) and information such as the travel route to the delivery destination. Note that the drive unit 31 that transmits the departure instruction may be the drive unit 31 that is waiting at a waiting place or the drive unit 31 that is moving nearby.

Subsequently, when the drive unit 31 arrives at the delivery destination, the drive unit controller 111 transmits, to the drive unit 31, a departure instruction for causing the drive unit 31 coupled with the carriage 32 to depart from the delivery destination to a preset moving place. The "departure instruction" includes information on the moving place to which the drive unit 31 is headed (e.g., address of moving place) and information such as a travel route to the moving place. Note that, when waste is collected by using the vacant carriage 32, the moving place of the carriage 32 includes a waste dump. Furthermore, when a returned product is collected by using the vacant carriage 32, the moving place of the carriage 32 includes a store at which the product has been purchased and the like.

As described above, in the product delivery system, the product delivery device, and the product delivery program according to the embodiment, the time and effort for a user to discard waste or return a product may be reduced by collecting the waste or the returned product by using the vacant carriage 32 at the time when a product is delivered to a delivery destination, so that the convenience of the user may be improved.

The user inventory management unit 112 manages the inventory of products such as food and daily necessities at a user home, and automatically orders the products from a store when the inventory is insufficient. The user inventory management unit 112 constantly or periodically acquires inventory information on products held by a user (hereinafter, referred to as "user inventory information") from an inventory information transmitter 414 of the terminal 40. The user inventory information includes information such as a product name (or product number, product ID, and the like) and a quantity of each product.

Subsequently, the user inventory management unit 112 determines whether or not the inventory of products held by the user is insufficient based on the user inventory information. Note that a method of determining whether or not the inventory of products is insufficient is not particularly limited. For example, it may be determined that the inventory is insufficient when the inventory is depleted. It may be determined that the inventory is insufficient when an inventory level falls below a level designated by the user.

When determining that the inventory of products held by the user is insufficient, the user inventory management unit 112 creates order information for ordering a product with an insufficient inventory from a store, and transmits the created order information to the store server 20. The "order information" includes information such as an orderer (username or user ID), order date and time, an order number, a product name (or product number, product ID, or the like), an order quantity, an order amount, a delivery destination (e.g., address of user home), and designated date and time for delivery.

As described above, in the product delivery system, the product delivery device, and the product delivery program according to the embodiment, the time and effort for a user to order a product may be reduced by performing not only delivery of a product but inventory management of a product held by the user, so that the convenience of the user may be improved. That is, it is possible to reduce domestic man-hours such as domestic ingredient management, stock management for daily necessities, and associated procurement work and transportation work.

The communicator 12 includes, for example, a local area network (LAN) interface board and a wireless communication circuit for wireless communication. The communicator 12 is connected to the network NW such as the Internet, which is a public communication network. Then, the communicator 12 is connected to the network NW to communicate with the store server 20, the drive unit 31, and the terminal 40.

The storage 13 includes a recording medium such as an erasable programmable ROM (EPROM), a hard disk drive (HDD), and a removable medium. Examples of the removable medium include disc recording media such as a universal serial bus (USB) memory, a compact disc (CD), a digital versatile disc (DVD), and a Blu-ray (registered trademark) disc (BD). The storage 13 may store an operating system (OS), various programs, various tables, various databases, and the like.

The storage 13 stores user information 131, order history information 132, and user inventory information 133.

The user information 131 relates to a user who uses product order service using the moving body 30. The user information 131 includes, for example, information for identifying a user, such as a username (or user ID and the like) and an address and a telephone number of the user.

The order history information 132 relates to a history of products ordered by the user. The order history information 132 includes information such as an orderer (username or user ID), order date and time, an order number, a product name (or product number, product ID, or the like), an order quantity, an order amount, a delivery destination (e.g., address of user home), and designated date and time for delivery for each order or orderer, for example.

The user inventory information 133 relates to the inventory of products held by the user. The user inventory information 133 includes, for example, information such as a product name (or product number, product ID, and the like) and a quantity of each product.

The store server 20 is provided in a store that sells products. Furthermore, the store server 20 is implemented by a general-purpose computer such as a workstation and a personal computer. Note that a plurality of stores may be set, or only one store may be set. Furthermore, when a plurality of stores is set, the store server 20 may be provided in each store, or the store server 20 may be provided in one of the stores.

As illustrated in FIG. 2, the store server 20 includes a controller 21, a communicator 22, and a storage 23. The controller 21, the communicator 22, and the storage 23 are similar to the controller 11, the communicator 12, and the storage 13 as hardware. The controller 21 functions as the scheduled loading time calculator 211 and the loading completion notification transmitter 212 through the execution of a program stored in the storage 23.

The scheduled loading time calculator 211 calculates a scheduled loading time onto the carriage 32 at a store, and transmits the calculated scheduled loading time to the center server 10. The scheduled loading time calculator 211 calculates the scheduled loading time based on, for example, a product order quantity, product size and weight, and the number of products capable of being loaded onto the carriage 32, which are included in the order information acquired from the terminal 40. Here, at the store, the carriage 32 and the user may be made to correspond to each other on one-to-one basis, and only a product ordered by one user may be loaded onto one carriage 32. In this case, the scheduled loading time calculator 211 calculates the time when the loading of the product ordered by one user onto the carriage 32 is completed as a scheduled loading time. Furthermore, at the store, the carriage 32 and the user may be made to correspond to each other on one-to-many basis, and products ordered by a plurality of users may be loaded onto one carriage 32. In this case, the scheduled loading time calculator 211 calculates the time when the loading of the products ordered by the plurality of users onto the carriage 32 is completed as a scheduled loading time.

When the loading of the products onto the carriage 32 is completed at the store, the loading completion notification transmitter 212 transmits a loading completion notification to the center server 10. The loading completion notification transmitter 212 may transmit the loading completion notification to the center server 10 based on, for example, the operation of a staff member of the store who has loaded the products onto the carriage 32.

Furthermore, the loading completion notification transmitter 212 may detect the loading completion of a product based on, for example, a measurement value of a weight sensor provided on the carriage 32, and transmit the loading completion notification to the center server 10 based on the detection result. Note that, for example, a staff member of the store may manually load a product onto the carriage 32, or a dedicated robot or the like may load a product onto the carriage 32.

The communicator 22 communicates with the center server 10 and the terminal 40 by wireless communication via the network NW. The storage 23 stores user information 231 and order history information 232.

The user information 231 relates to a user who uses product order service using the moving body 30. The user information 231 includes, for example, information for identifying a user, such as a username (or user ID and the like), an address and a telephone number of the user.

The order history information 232 relates to the history of a product ordered by the user. The order history information 232 includes information such as an orderer (username or user ID), order date and time, an order number, a product name (or product number, product ID, or the like), an order quantity, an order amount, a delivery destination (e.g., address of user home), and designated date and time for delivery for each order or orderer, for example.

Moving Body

The moving body 30 includes the drive unit 31 and the carriage 32. As illustrated in FIG. 1, the carriage 32 has a box shape, and may load baggage such as a product inside the carriage 32. Furthermore, a plurality of (e.g., two) racks for loading the baggage such as a product is installed on the carriage 32. Furthermore, the carriage 32 may have, for example, a weight sensor for measuring the weight of a product loaded onto the carriage 32 and a communication function for transmitting a measurement value of the weight sensor to the store server 20 and the like.

The drive unit 31 is an electric unit that may autonomously travels (automatically travels) under the control of the center server 10. Furthermore, the drive unit 31 includes, for example, a coupling attachment, and may be coupled with and decoupled from the carriage 32 onto which a product is loaded. Then, the drive unit 31 autonomously moves to a place (e.g., store and delivery destinations) designated by the center server 10 in a state of being coupled with or decoupled from the carriage 32.

As illustrated in FIG. 2, the drive unit 31 includes a controller 311, a communicator 312, a storage 313, a camera 314, a positioning unit 315, a sensor group 316, and the battery 317. The controller 311, the communicator 312, and the storage 313 are similar to the controller 11, the communicator 12, and the storage 13 as hardware.

The communicator 312 communicates with the center server 10 by wireless communication via the network NW. The storage 313 stores, for example, an image captured by the camera 314, position information on the drive unit 31 detected by the positioning unit 315, sensor information detected by the sensor group 316, and information such as the battery remaining amount of the drive unit 31, as necessary.

The camera 314 is provided for achieving autonomous traveling, and includes an imaging device having a built-in imaging element such as a charge coupled device (CCD) and a CMOS image sensor (CIS). A plurality of cameras 314 is installed at predetermined positions of the drive unit 31, for example. The camera 314 transmits a captured image to the center server 10 as necessary.

The positioning unit 315 receives radio waves from a global positioning system (GPS) satellite, and detects position information on the drive unit 31. A method of detecting position information is not limited to a method using a GPS satellite. For example, a method in which light detection and ranging/laser imaging detection and ranging (LiDAR) and a three-dimensional digital map are combined with each other may be used. The positioning unit 315 constantly or periodically transmits the detected position information to the center server 10.

The sensor group 316 includes a plurality of sensors for achieving autonomous traveling, and includes, for example, a 3D-LiDAR, a millimeter wave sensor, an infrared sensor, an acceleration sensor, a GPS sensor, and a vehicle speed sensor. The sensor group 316 transmits detected sensor data to the center server 10 as necessary.

The battery 317 supplies electric power to a power source (motor) of the drive unit 31. The controller 311 transmits the battery remaining amount of the battery 317 to the center server 10 as necessary.

Terminal

The terminal 40 is implemented by a smartphone, a mobile phone, a tablet terminal, a wearable computer, and the like held by a user who purchases a product.

As illustrated in FIG. 2, the terminal 40 includes a controller 41, a communicator 42, a storage 43, and an operation/display unit 44. The controller 41, the communicator 42, and the storage 43 are similar to the controller 11, the communicator 12, and the storage 13 as hardware. The controller 41 functions as the product ordering unit 411, the receipt completion notification transmitter 412, the carriage collection instruction transmitter 413, and the inventory information transmitter 414 through the execution of a program stored in the storage 43.

The product ordering unit 411 creates product order information based on the operation of the operation/display unit 44 performed by the user, and transmits the created order information to the center server 10 and the store server 20.

When the user completes the receipt of a product at a delivery destination of the product, the receipt completion notification transmitter 412 creates a receipt completion notification based on, for example, the operation of the operation/display unit 44 performed by the user, and transmits the created receipt completion notification to the center server 10.

When the user completes the loading of waste or a returned product at a delivery destination of the product, the carriage collection instruction transmitter 413 creates a carriage collection instruction based on, for example, the operation of the operation/display unit 44 performed by the user, and transmits the created carriage collection instruction to the center server 10.

The inventory information transmitter 414 constantly or periodically transmits user inventory information to the center server 10. The user inventory information indicates the inventory of products such as food and daily necessities in the user home. Note that, in order to update the user inventory information, the user may input information by himself/herself each time a product is consumed at the user home, or information acquired by an Internet of Things (IoT) compatible refrigerator or the like may be used.

The communicator 42 communicates with the center server 10 and the store server 20 by wireless communication via the network NW. The storage 43 stores, for example, information such as user order history information and user inventory information and application software (product ordering application) for a user to order a product, as necessary.

The operation/display unit 44 includes, for example, a touch panel display. The operation/display unit 44 has an input function and a display function. The input function is used for receiving an operation with, for example, a finger of a user or a pen. The display function is used for displaying various pieces of information under the control of the controller 41. The operation/display unit 44 displays, for example, a screen of a product ordering application installed in the terminal 40 under the control of the controller 41.

Product Delivery Method

Figure 3:
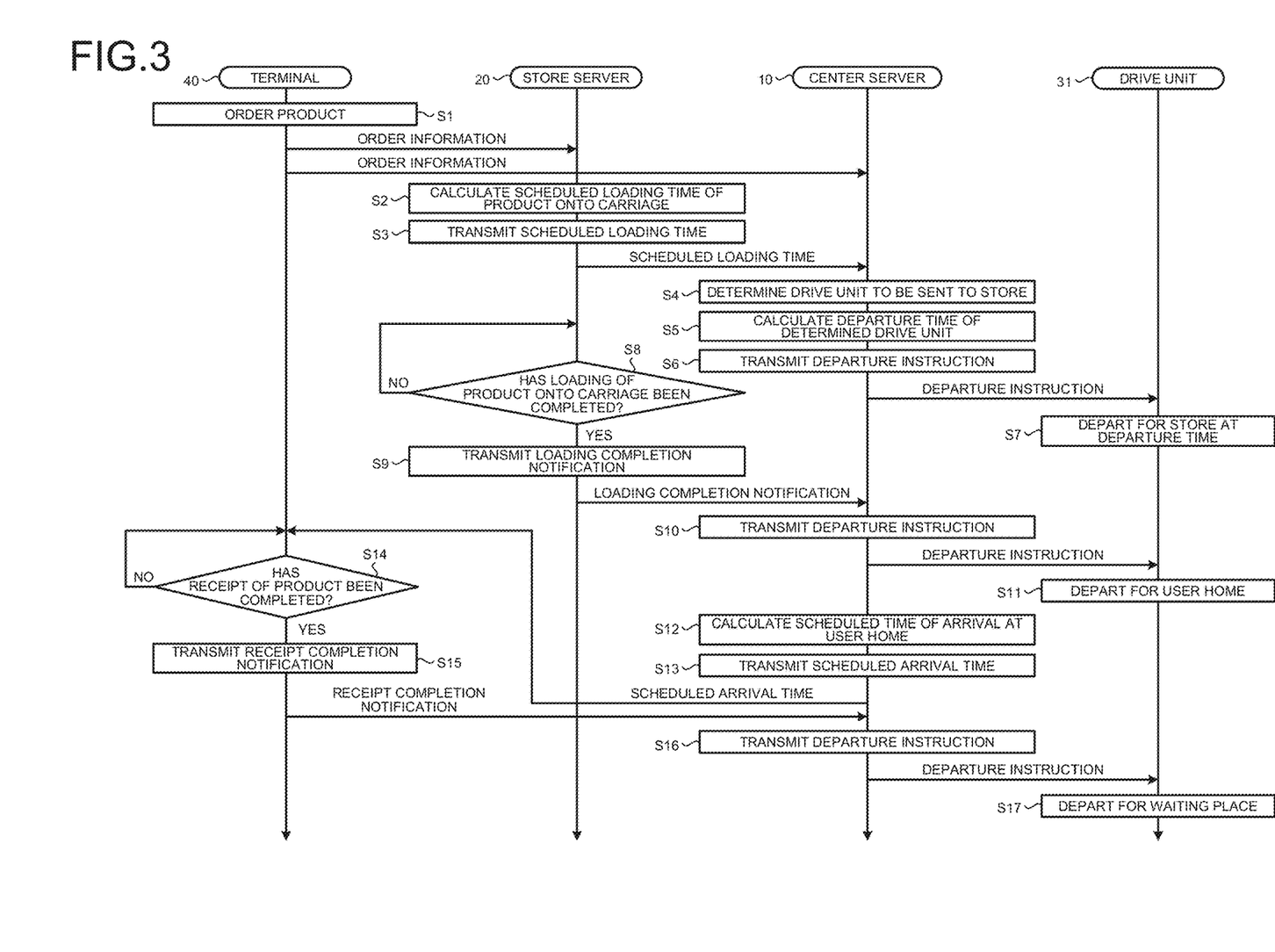
FIG. 3 is a flowchart illustrating one example of a processing procedure of a product delivery method executed by the product delivery system according to the embodiment.

One example of processing procedures of a product delivery method executed by the product delivery system 1 according to the embodiment will be described with reference to FIG. 3. Note that, in the following description, it is assumed that the delivery destination of a product is a user home.

First, the product ordering unit 411 of the terminal 40 orders a product (Step S1), and transmits the order information to the center server 10 and the store server 20. Subsequently, the scheduled loading time calculator 211 of the store server 20 calculates a scheduled loading time based on, for example, a product order quantity, product size and weight, and the number of products capable of being loaded onto the carriage 32, which are included in the order information (Step S2), and transmits the calculated scheduled loading time to the center server 10 (Step S3).

Subsequently, the drive unit controller 111 of the center server 10 determines the drive unit 31 to be sent to a store based on, for example, the current position and the battery remaining amount of the drive unit 31, and the like (Step S4). Subsequently, the drive unit controller 111 calculates a departure time of the drive unit 31 based on, for example, the distance from the current position of the drive unit 31 to the store, the moving speed (e.g., average moving speed) of the drive unit 31, and the scheduled loading time (Step S5), and transmits a departure instruction including the calculated departure time to the drive unit 31 (Step S6). Accordingly, the drive unit 31 departs for the store at the departure time (Step S7).

Subsequently, the loading completion notification transmitter 212 determines whether or not the loading of the product onto the carriage 32 has been completed (Step S8). When determining that the loading of the product onto the carriage 32 has been completed (Yes in Step S8), the loading completion notification transmitter 212 transmits a loading completion notification to the center server 10 (Step S9). In contrast, when determining that the loading of the product onto the carriage 32 has not been completed (No in Step S8), the loading completion notification transmitter 212 returns to the determination processing of Step S8.

Subsequently, the drive unit controller 111 transmits a departure instruction to the drive unit 31 (Step S10). Accordingly, the drive unit 31 departs for the user home (Step S11).

Subsequently, the drive unit controller 111 calculates a scheduled arrival time based on, for example, the time when the drive unit 31 departs from the store, the distance from the store to the user home, and the moving speed (e.g., average moving speed) of the drive unit 31 (Step S12), and transmits the calculated scheduled arrival time to the terminal 40 (Step S13).

Subsequently, the receipt completion notification transmitter 412 determines whether or not the receipt of the product has been completed (Step S14). When determining that the receipt of the product has been completed (Yes in Step S14), the receipt completion notification transmitter 412 transmits a receipt completion notification to the center server 10 (Step S15). In contrast, when determining that the receipt of the product has not been completed (No in Step S14), the receipt completion notification transmitter 412 returns to the determination processing of Step S14.

Subsequently, the drive unit controller 111 transmits a departure instruction to the drive unit 31 (Step S16). Accordingly, the drive unit 31 departs for a waiting place (Step S17), and the processing is completed.

As described above, according to the product delivery system, the product delivery device, and the product delivery program of the embodiment, when a product is loaded onto the carriage 32 at a store, the drive unit 31 sent to the store automatically delivers the carriage 32 to a delivery destination (e.g., user home). Therefore, the time and effort for delivering a product may be reduced at a store.

Additional effects and variations may be easily derived by those skilled in the art. Accordingly, the broader aspects of the present disclosure are not limited to the particular details and representative embodiments illustrated and described above. Therefore, various modifications may be made without departing from the spirit or scope of the general inventive concept defined by the appended claims and equivalents thereof.

For example, in the product delivery system, the product delivery device, and the product delivery program according to the embodiment, when a plurality of stores is set, a store at which a product ordered by a user is loaded (hereinafter, referred to as "product loading store") may be determined from the plurality of stores. In this case, the controller 11 of the center server 10 determines, as the product loading store, a store that is closest to the delivery destination (store having shortest distance to delivery destination) and that has an inventory of the product ordered by the user among the plurality of stores, for example. Then, the scheduled loading time calculator 211 calculates a scheduled loading time (see Step S2 in FIG. 3), and performs the subsequent processing.

Furthermore, in the product delivery system, the product delivery device, and the product delivery program according to the embodiment, when a product is delivered to the delivery destination, a product other than the product ordered by the user may be loaded onto the carriage 32 and delivered to the delivery destination to be distributed or sold to the user. Examples of the "product other than the product ordered by the user" include a free sample product, a new product at the store, and a product sold by a local private shop. As described above, for example, products may be promoted by delivering a product other than the product ordered by the user together.

Furthermore, in the product delivery system, the product delivery device, and the product delivery program according to the embodiment, a delivery assistant may come together when a product is delivered to a delivery destination. In this case, the terminal 40 held by the delivery assistant is preliminarily registered in the center server 10. When a product is delivered to a delivery destination near the delivery assistant, information on an accompanying instruction is transmitted to the terminal 40 of the delivery assistant, and the delivery assistant is headed to the delivery destination. As described above, a feeling of anxiety about unmanned delivery of a product may be reduced by causing a delivery assistant to come together at the time of delivering the product. Furthermore, it is possible to assist in coupling and decoupling the carriage 32 with and from the drive unit 31 and to cope with other troubles.

Furthermore, in the product delivery system, the product delivery device, and the product delivery program according to the embodiment, when the vacant carriage 32 is used to collect waste and a returned product, the collection may be performed not in units of the carriages 32 but in units of racks installed on the carriage 32. In this case, only a rack is lent to a user to collect the waste and the returned product without decoupling the carriage 32 from the drive unit 31. Then, the drive unit controller 111 causes the drive unit 31 towing the vacant carriage 32 to wait at a waiting place or the like. After acquiring a carriage collection instruction from the terminal 40, the drive unit controller 111 sends the drive unit 31 to the delivery destination again, and collects the waste and the returned product. As described above, a rack of the carriage 32 may be brought into the user home by lending only the rack to the user, so that the convenience of the user may be improved.

Furthermore, in the product delivery system, the product delivery device, and the product delivery program according to the embodiment, the drive unit 31 may be managed by a management company (e.g., dealer), or rented by a store. Furthermore, the carriage 32 may also be managed by a management company, rented by a store, or rented by one or a plurality of users.

Furthermore, in the product delivery system, the product delivery device, and the product delivery program according to the embodiment, a component used for assembling (or repairing) a product may be delivered in addition to products such as food and daily necessities. In this case, the user is a "product manufacturer", and the store is a "component manufacturer". As a result, time and effort for procuring a component at the time of assembling a product may be reduced.

Furthermore, in the product delivery system, the product delivery device, and the product delivery program according to the embodiment, the size of the carriage 32 may be changed in accordance with a product transportation amount. In this case, components constituting the carriage 32 are rearranged in accordance with the amount of products to be loaded onto the carriage 32 to change the loadable capacity of the carriage 32. As described above, space efficiency may be increased by changing the size of the carriage 32 in accordance with the product transportation amount. Furthermore, a simple configuration and common components of the carriage 32 may improve the maintainability of the carriage 32.

Furthermore, in the product delivery system, the product delivery device, and the product delivery program according to the embodiment, a cartridge type fuel cell (FC) tank may be provided in the drive unit 31. As described above, the FC tank provided in the drive unit 31 allows power supply only by replacing the FC tank, so that waiting time for charging may be reduced.

According to the present disclosure, time and effort for delivering a product may be reduced at a store.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A product delivery system, comprising:
   a center server comprising a processor;
   a store server provided in a store selling a product to be delivered;
   a moving body including:
      a carriage configured to carry the product to be loaded at the store, and
      a driver configured to autonomously travel under control of the center server, and configured to be coupled with and decoupled from the carriage; and
   a terminal held by a user purchasing the product, wherein the processor of the center server is configured to:
      in response to order information on the product being output from the terminal to the store server, acquire, from the store server, a scheduled loading time representing a completion time of loading of the product onto the carriage at the store;
      output, to the driver, a first instruction for causing the driver to depart from a current position to the store in time for the scheduled loading time; and
      in response to acquiring, from the store server, a loading completion notification indicating that loading of the product onto the carriage has been completed at the store, output, to the driver, a second instruction for causing the driver coupled with the carriage to depart from the store to a delivery destination of the product; and
   the processor is further configured to
      in response to acquiring, from the terminal, a receipt completion notification indicating that receipt of the product has been completed, output, to the driver, a third instruction for causing the driver decoupled from the carriage to depart from the delivery destination of the product to a preset place;

after delivering the product to the delivery destination, and in response to (i) receiving waste or a returned product onto the carriage decoupled from the driver and (ii) loading of the waste or the returned product onto the carriage decoupled from the driver being completed at the delivery destination, acquire, from the terminal, a carriage collection instruction for requesting collection of the carriage;

in response to acquiring, from the terminal, the carriage collection instruction, output, to the driver, a fourth instruction for causing the driver to depart from a current position to the delivery destination of the product; and in response to the driver arriving at the delivery destination of the product, output, to the driver, a fifth instruction for causing the driver coupled with the carriage to depart from the delivery destination of the product to the preset place.

2. The product delivery system according to claim 1, wherein
the processor is further configured to, in response to acquiring the loading completion notification from the store server, output, to the terminal, a scheduled arrival time representing an arrival time of the driver at the delivery destination of the product.

3. The product delivery system according to claim 1, wherein
the processor is further configured to:
acquire inventory information on the product held by the user from the terminal;
determine whether or not an inventory of the product held by the user is insufficient based on the inventory information, and
in response to determining that the inventory of the product held by the user is insufficient, output, to the store server, order information for ordering the product with the insufficient inventory from the store.

4. The product delivery system according to claim 1, wherein
the processor is further configured to determine the moving body to be sent to the store based on a current position of the moving body and a remaining amount of a battery of the moving body.

5. A product delivery device, comprising:
a processor configured to:
in response to order information on a product being output from a terminal to a store server provided in a store selling the product to be delivered, acquire, from the store server, a scheduled loading time representing a completion time of loading of the product onto a carriage of a moving body at the store, wherein the terminal is held by a user purchasing the product, and the moving body includes:
the carriage configured to carry the product to be loaded at the store, and
a driver configured to autonomously travel, and configured to be coupled with and decoupled from the carriage;
output, to the driver, a first instruction for causing the driver to depart from a current position to the store in time for the scheduled loading time; and
in response to acquiring, from the store server, a loading completion notification indicating that loading of the product onto the carriage has been completed at the store, output, to the driver, a second instruction for causing the driver coupled with the carriage to depart from the store to a delivery destination of the product, wherein the processor is further configured to
in response to acquiring, from the terminal, a receipt completion notification indicating that receipt of the product has been completed, output, to the driver, a third instruction for causing the driver decoupled from the carriage to depart from the delivery destination of the product to a preset place;

after delivering the product to the delivery destination, and in response to (i) receiving waste or a returned product onto the carriage decoupled from the driver and (ii) loading of the waste or the returned product onto the carriage decoupled from the driver being completed at the delivery destination, acquire, from the terminal, a carriage collection instruction for requesting collection of the carriage;

in response to acquiring, from the terminal, the carriage collection instruction, output, to the driver, a fourth instruction for causing the driver to depart from a current position to the delivery destination of the product; and in response to the driver arriving at the delivery destination of the product, output, to the driver, a fifth instruction for causing the driver coupled with the carriage to depart from the delivery destination of the product to the preset place.

6. The product delivery device according to claim 5, wherein
the processor is further configured to, in response to acquiring the loading completion notification from the store server, output, to the terminal, a scheduled arrival time representing an arrival time of the driver at the delivery destination of the product.

7. The product delivery device according to claim 5, wherein
the processor is further configured to:
acquire inventory information on the product held by the user from the terminal;
determine whether or not an inventory of the product held by the user is insufficient based on the inventory information, and
in response to determining that the inventory of the product held by the user is insufficient, output, to the store server, order information for ordering the product with the insufficient inventory from the store.

8. The product delivery device according to claim 5, wherein
the processor is further configured to determine the moving body to be sent to the store based on a current position of the moving body and a remaining amount of a battery of the moving body.

9. A non-transitory computer-readable recording medium on which a program is recorded, the program instructing a processor of a computer to execute:
in response to order information on a product being output from a terminal held to a store server provided in a store selling the product to be delivered, acquiring, from the store server, a scheduled loading time representing a completion time of loading of the product onto a carriage of a moving body at the store, wherein the terminal is held by a user purchasing the product, and the moving body includes:
the carriage configured to carry the product to be loaded at the store, and a driver configured to autonomously travel, and configured to be coupled with and decoupled from the carriage;

outputting, to the driver, a first instruction for causing the driver to depart from a current position to the store in time for the scheduled loading time; and in response to acquiring, from the store server, a loading completion notification indicating that loading of the product onto the carriage has been completed at the store, outputting, to the driver, a second instruction for causing the driver coupled with the carriage to depart from the store to a delivery destination of the product, wherein the processor is further instructed by the program to execute;

in response to acquiring, from the terminal, a receipt completion notification indicating that receipt of the product has been completed, outputting, to the driver, a third instruction for causing the driver decoupled from the carriage to depart from the delivery destination of the product to a preset place;

after delivering the product to the delivery destination, and in response to (i) receiving waste or a returned product onto the carriage decoupled from the driver and (ii) loading of the waste or the returned product onto the carriage decoupled from the driver being completed at the delivery destination, acquiring, from the terminal, a carriage collection instruction for requesting collection of the carriage;

in response to acquiring, from the terminal, the carriage collection instruction, outputting, to the driver, a fourth instruction for causing the driver to depart from a current position to the delivery destination of the product; and in response to the driver arriving at the delivery destination of the product, outputting, to the driver, a fifth instruction for causing the driver coupled with the carriage to depart from the delivery destination of the product to the preset place.

10. The non-transitory computer-readable recording medium according to claim 9, wherein the processor is further instructed by the program to execute, in response to acquiring the loading completion notification from the store server, outputting, to the terminal, a scheduled arrival time representing an arrival time of the driver at a delivery destination of the product.

11. The non-transitory computer-readable recording medium according to claim 9, wherein the processor is further instructed by the program to execute:

acquiring inventory information on the product held by the user from the terminal;

determining whether or not an inventory of the product held by the user is insufficient based on the inventory information, and in response to determining that the inventory of the product held by the user is insufficient, outputting, to the store server, order information for ordering the product with the insufficient inventory from the store.

12. The non-transitory computer-readable recording medium according to claim 9, wherein the processor is further instructed by the program to execute determining the moving body to be sent to the store based on a current position of the moving body and a remaining amount of a battery of the moving body.

* * * * *